(12) United States Patent
Yoshinaga et al.

(10) Patent No.: US 6,439,872 B1
(45) Date of Patent: Aug. 27, 2002

(54) APPARATUS FOR MANUFACTURING LENSES FOR VEHICLE LAMPS

(75) Inventors: Mitsuteru Yoshinaga; Makoto Sano, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 46 days.

(21) Appl. No.: 09/662,899

(22) Filed: Sep. 15, 2000

(30) Foreign Application Priority Data

Sep. 16, 1999 (JP) ............................................. 11-261854

(51) Int. Cl.$^7$ ............................................. B29D 11/00
(52) U.S. Cl. ....................... 425/112; 425/576; 425/588; 425/808
(58) Field of Search ................................. 425/588, 808, 425/112, 576; 264/1.7, 1.9, 247, 255, 328.7, 328.8

(56) References Cited

U.S. PATENT DOCUMENTS

| | | | |
|---|---|---|---|
| 2,332,537 A | * 10/1943 | Slatis | ........................... 249/54 |
| 3,859,024 A | * 1/1975 | Pasch et al. | ................. 425/547 |
| 5,642,228 A | 6/1997 | Takezawa et al. | ........... 359/642 |
| 5,721,039 A | 2/1998 | Yanagihara et al. | ......... 428/172 |
| 5,756,013 A | 5/1998 | Yanagihara et al. | |
| 5,842,781 A | 12/1998 | Yamada et al. | .............. 362/519 |
| 5,922,369 A | 7/1999 | Yanagihara et al. | ......... 425/572 |

\* cited by examiner

*Primary Examiner*—Jan H. Silbaugh
*Assistant Examiner*—Donald Heckenberg
(74) *Attorney, Agent, or Firm*—Sughrue Mion, PLLC

(57) ABSTRACT

There is provided an apparatus for manufacturing lenses for vehicle lamps, wherein the lenses are formed from at least first and second types of synthetic resins by molding the first and second synthetic resins integrally with each other. The apparatus includes a first mold having a common mold and a first stationary mold and defining a first cavity in which the first synthetic resin is injection molded, and a second mold constructed from the common mold and a second stationary mold and defining a second cavity in which the first synthetic resin and the second synthetic resin are molded integrally with each other with the first synthetic resin being contained within the second cavity. A partition wall is provided on the first stationary mold in such a manner as to protrude therefrom for preventing the first synthetic resin from intruding into any place other than the first cavity when the first mold is closed. Also, a distal end face of the partition wall is shaped such that the distal end face gradually tapers away from the common mold as the distal end face gets farther away from the first cavity.

7 Claims, 6 Drawing Sheets

APPARATUS FOR MANUFACTURING LENSES FOR VEHICLE LAMPS

This is a Continuation of Japanese Patent Application No. Hei. 11-261854, with a filing date of Sep. 16, 1999, the disclosure of which is incorporated into this application by reference.

BACKGROUND OF THE INVENTION

1. Field of the Invention

The present invention relates to an apparatus for manufacturing lenses for vehicle lamps wherein lenses are molded integrally using at least two types of synthetic resins.

2. Description of the Related Art

In a conventional apparatus for manufacturing lenses for vehicle rear combination lamps wherein the lenses are molded integrally using at least two types of synthetic resins, e.g., a lens molded in two colors, a first cavity is defined by a first stationary mold and a common mold for injection of the first colored resin into the first cavity, and a second cavity is defined by a second stationary mold and the common mold for injection of the second colored resin into the second cavity.

To be specific, as shown in FIGS. 9 and 10, a first cavity 103 is defined by a common mold 101 and a first stationary mold 102, and a second cavity 105 is defined by the common mold 101 and a second stationary mold 104.

As shown in FIG. 11, a partition wall 108 having a width of, for instance, in the order of 5 mm is provided on the first stationary mold 102 in such a manner as to protrude therefrom so that when the common mold 101 and the first stationary mold 102 are assembled together, the first colored resin 107 is prevented from intruding into a portion 106 which constitutes a part of the second cavity 105 when the common mold 101 and the second stationary mold 104 are assembled together.

Following this, the second stationary mold 104 is assembled to the common mold 101 and the second colored resin 109 is injected into the second cavity 105 including the portion 106 with the first colored resin 107 being contained therein, whereby a lens 110 is produced.

When the common mold 101 and the first stationary mold 102 are assembled together so as to define the first cavity 103, since the distal end of the partition wall 108 abuts against a molding surface 111 of the common mold 101 which is a surface for molding the resin, several problems may occur. For instance, it has occurred that foreign particles are held between the partition wall 108 and the common mold 101, or that a contact mark of the partition wall 108 remains on the molding surface 111, or the molding surface 111 is damaged through repeatedly using the common mold 101 and the stationary mold 102.

Consequently, since the contact mark or the flaw is transferred to the lens 110, the appearance of the lens 110 is deteriorated. Alternatively, in a case where the location where the contact mark or the flaw is transferred is the surface of, e.g., a lens element, it has occurred that the lens is affected optically.

The present invention was made in view of the above problems, and an object of the present invention is to prevent a molding surface, of a vehicle lamp lens molding apparatus (wherein the lenses are molded integrally using at least two types of synthetic resin), from being marked after contacts with, or damaged by, a partition wall. The partition wall is necessary for preventing a first-molded resin from flowing into an area where another resin to be molded later is to be injected.

SUMMARY OF THE INVENTION

With a view to solving the problem, according to the invention, there is provided an apparatus for manufacturing lenses for vehicle lamps, wherein the lenses are formed from at least first and second types of synthetic resins by molding the first and second synthetic resins integrally with each other, the apparatus comprising a first mold comprising a common mold and a first stationary mold and defining a first cavity in which the first synthetic resin is injection molded, and a second mold comprising the common mold and a second stationary mold and defining a second cavity in which the first synthetic resin and the second synthetic resin are molded integrally with each other with the first synthetic resin being contained within the second cavity. Furthermore, a partition wall is provided on the first stationary mold, in such a manner as to protrude therefrom, for preventing the first synthetic resin from intruding into any place other than the first cavity when the first mold is closed, and wherein a distal end face of the partition wall is shaped such that the distal end face gradually tapers away from the common mold from a point on the distal end face closest to the first cavity to a point on the distal end face furthest from the first cavity.

Thus, there is no risk of a contact mark or a flaw being inflicted by the distal end face of the partition wall on the molding surface of the common mold.

DETAILED DESCRIPTION OF THE PREFERRED EMBODIMENTS

Referring to the accompanying drawings, an embodiment of the apparatus for manufacturing lenses for vehicle lamps according to the invention will be described below.

First, a lens 1 for a vehicle lamp to which the invention is applied will be described, wherein the lens is molded in multiple colors from two types of resins having different colors (hereinafter, referred to as simply a "lens").

The lens 1 is formed from a transparent thermoplastic resin such as acrylic resin or polycarbonate resin.

Figure 3:
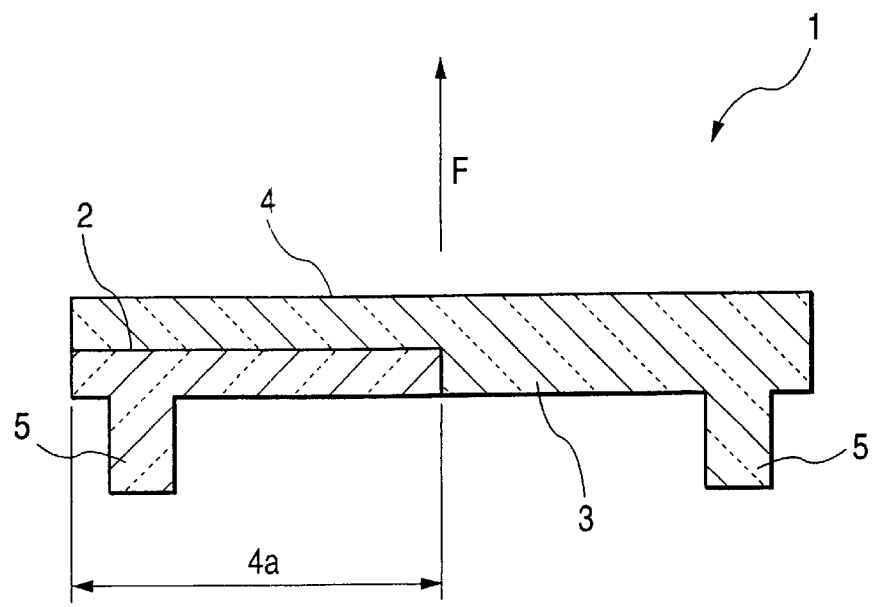
FIG. 3 depicts a schematic sectional view showing a lens for a vehicle lamp.

Namely, as shown in FIG. 3, two resin portions each having its own color are laminated and molded integrally with each other so as to form the lens 1, and the two resin portions are, for instance, a red resin portion 2 which is red transparent and a clear resin portion 3 which is colorless transparent. Additionally, the lens 1 comprises a main portion 4 facing substantially forward (in a direction indicated by an arrow F) and sealing legs 5 extending substantially rearward from the peripheral edge portion of the main portion 4, the main portion 4 and the sealing legs 5 being formed integrally with each other.

Thus, as described above, since the main portion 4 has a construction in which the clear resin portion 3 is laminated on the red resin portion 2 including one of the sealing legs 5, and the sealing legs 5 comprise a portion formed from red resin 6 (see FIG. 2) and a portion formed from clear resin 7 (see FIG. 2), or white resin, when the main portion 4 of the lens 1 is seen from the front, a portion of the main portion 4 where the red resin portion 2 and the clear resin portion 3 are laminated on each other (a laminated portion 4a) is designed to look red. This is because the red resin portion 2 is visible through the clear resin portion 3 when the laminated portion 4a is seen from the front.

Next, the apparatus for manufacturing lenses for vehicle lamps according to the invention will be described.

Figure 1:
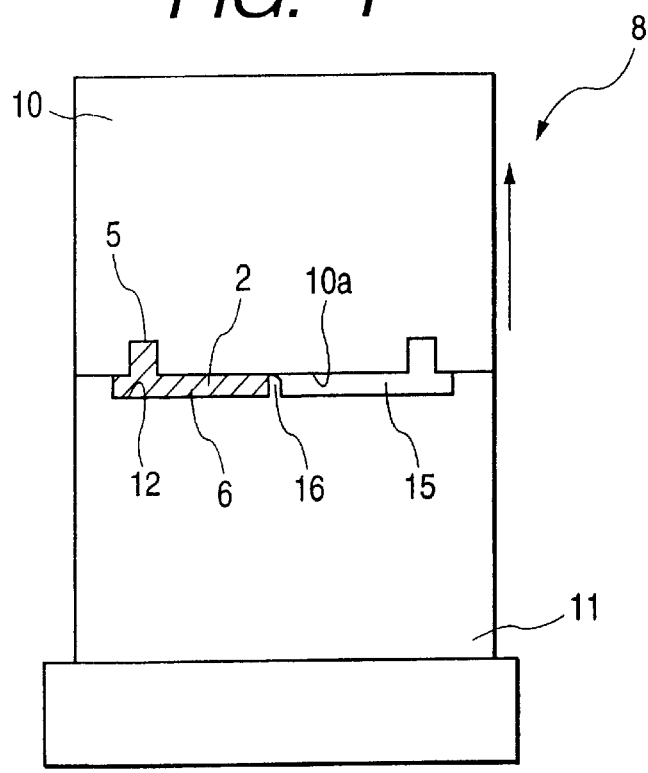
FIG. 1 depicts a schematic view showing a first mold and illustrating, together with FIGS. 2 and 4, an embodiment of an apparatus for manufacturing lenses for vehicle lamps according to the invention.
Figure 2:
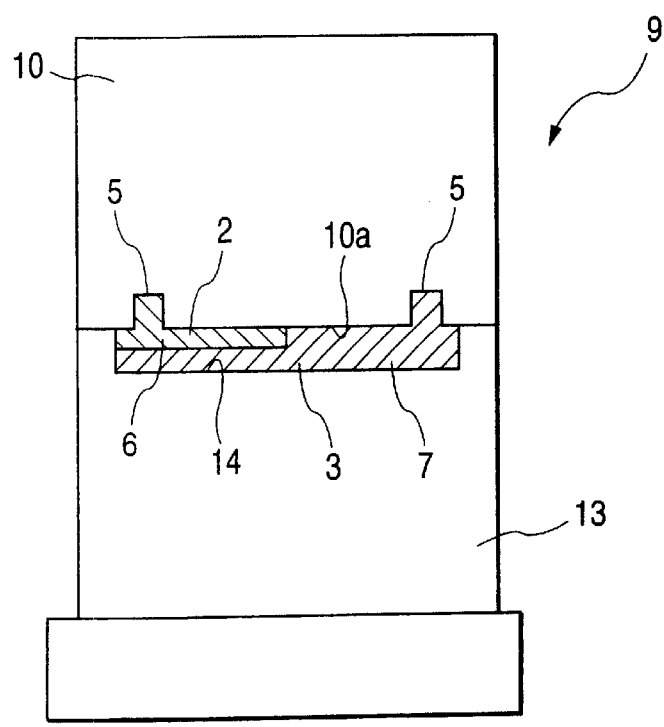
FIG. 2 depicts a schematic view showing a second mold.

As shown in FIGS. 1 and 2, the apparatus for manufacturing lenses for vehicle lamps comprises a first mold 8 used for injecting and molding the red resin (the first resin) 6 and a second mold 9 used for injecting and molding the clear resin (the second resin) 7 together with the red resin 6 which is also contained within the second mold 9.

The first mold 8 comprises a common (movable) mold 10 and a first stationary mold 11 and defines a first cavity 12, which is a space for injecting and molding the red resin 6.

Additionally, the second mold 9 comprises the common mold 10 and a second stationary mold 13 and defines a second cavity 14, which is a space for injecting the clear resin 7 into the remaining portion with the red resin portion 2, formed by the first mold 8, also contained therein.

Figure 4:
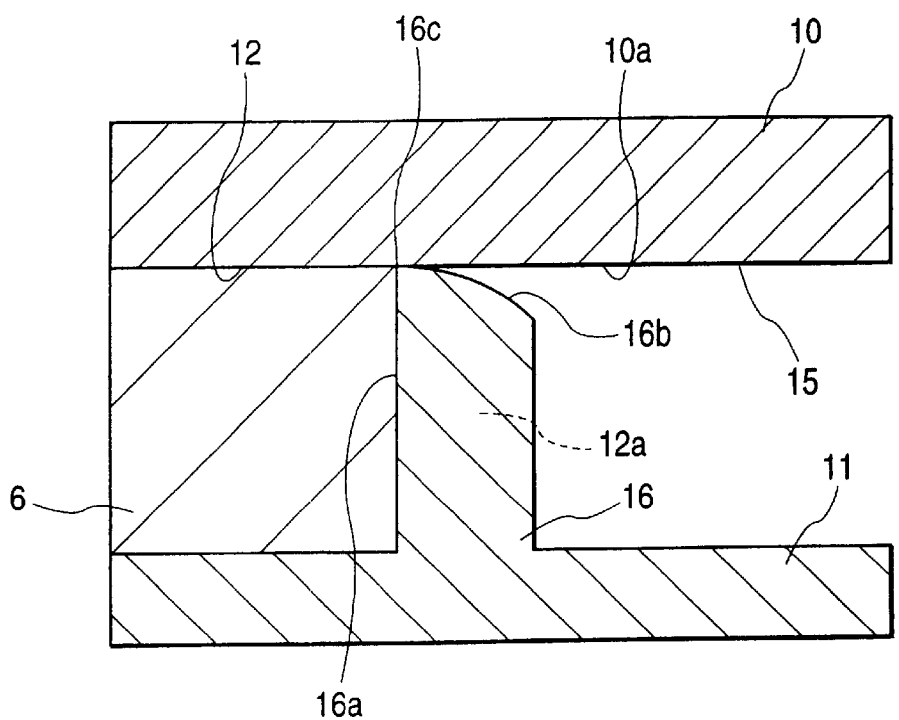
FIG. 4 depicts a schematic view showing a partition wall.

Moreover, as shown in FIGS. 1 and 4, a partition wall 16 having a width of, for instance, in the order of 5 mm is provided on the first stationary mold 11 in such a manner as to protrude therefrom or protrude therefrom integrally so that when the common mold 10 and the first stationary mold 11 are assembled together, the partition wall 16 is brought into abutment with a molding surface 10a of the common mold 10. The partition wall thereby prevents the red resin 6 from flowing into a portion 15, which constitutes a part of the second cavity 14, when the common mold 10 and the second stationary mold 13 are assembled together.

As shown in FIG. 4, the partition wall 16 has a partition surface 16a, a distal end face 16b and an apex portion 16c when the first mold 8 is clamped, the apex portion 16c is brought into abutment with the molding surface 10a at a boundary portion 12a between the first cavity 12 and the portion 15 constituting the part of the second cavity 14. Additionally, the partition wall 16 is shaped such that as the distal end face 16b of the partition wall 16 gets farther from the first cavity 12 side toward the side where the portion 15 exists (i.e., from the partition surface 16a), the partition wall 16 is displaced so as to gradually taper away from the molding surface 10a of the common mold 10. Namely, the distal end face 16b is formed substantially into an arc-like shape in section or is shaped such that the radius of curvature (the variation) thereof increases as the distal end face 16b gets farther away from the first cavity 12.

Therefore, as will be described later, when the first mold 8 is clamped, the partition wall 16 comes into so-called line contact, not surface contact as seen in the case of the prior art, with the molding surface 10a of the common mold 10 at the apex portion 16c thereof. Therefore, even if the contact mark of the partition wall 16 resulting from the repeated use of the first mold 8 is inflicted on the molding surface 10a, the contact mark so inflicted will be limited to a minimum size and be formed along the boundary portion 12a between the red resin portion 2 and the clear resin portion 3. As such the light distribution properties of the lens 1 are not affected at all.

In addition, even if there is foreign matter held between the partition wall 16 and the molding surface 10a of the common mold 10, since the foreign matter does not stay held there due to the shape of the partition wall 16 at the distal end face 16b and the apex portion 16c, there is no risk of a flaw being inflicted on the molding surface 10a of the common mold 10 by the foreign matter.

Finally, a molding process by the apparatus for manufacturing lenses for vehicle lamps will be described.

FIG. 1 shows a state in which the clamping is effected by the first mold 8. The red resin 6 is injected into the first cavity 12 defined by the common mold 10, the stationary mold 11 and the partition wall 16, so as to mold the red resin portion 2 of the lens 1. After the red resin portion 2 is cooled and set, the common mold 10 is moved in a direction indicated by an arrow, whereby the first mold 8 is opened.

When this happens, the first stationary mold 11 is not moved, and the red resin portion 2, which is a semi-fabricated product, remains in the common mold 10.

As shown in FIG. 2, the common mold 10 with the red resin portion 2 being affixed thereto is caused to face the second stationary mold 13 and the two molds are clamped together. The second mold 9 is constituted by the common mold 10 and the second stationary mold 13, and the second cavity 14 is defined in the second mold 9.

Then, the clear resin 7 is injected into the second cavity 14 with the red resin portion 2 also contained therein to thereby mold the clear resin portion 3, which includes the laminated portion 4a and the sealing legs 5.

After the resin injected into the second cavity 14 is cooled and set, the common mold 10 is moved to open the mold, and a molded product or a lens 1 is removed therefrom.

Note that, normally, lens elements are formed on a lens for a vehicle lamp but the embodiment has been described without a lens element being formed on the internal side of the main portion 4 of the lens 1.

Next, as a modification to the aforesaid lens 1, a case will be described below in which lens elements are formed on a lens 20. In a description below, since the lens 20 and the lens 1 are different from each other only in that the lens elements are formed on the former, like reference numerals of those used in the description of the lens 1 are used for like portions of the lens 20, and descriptions thereof will be omitted.

Figure 5:
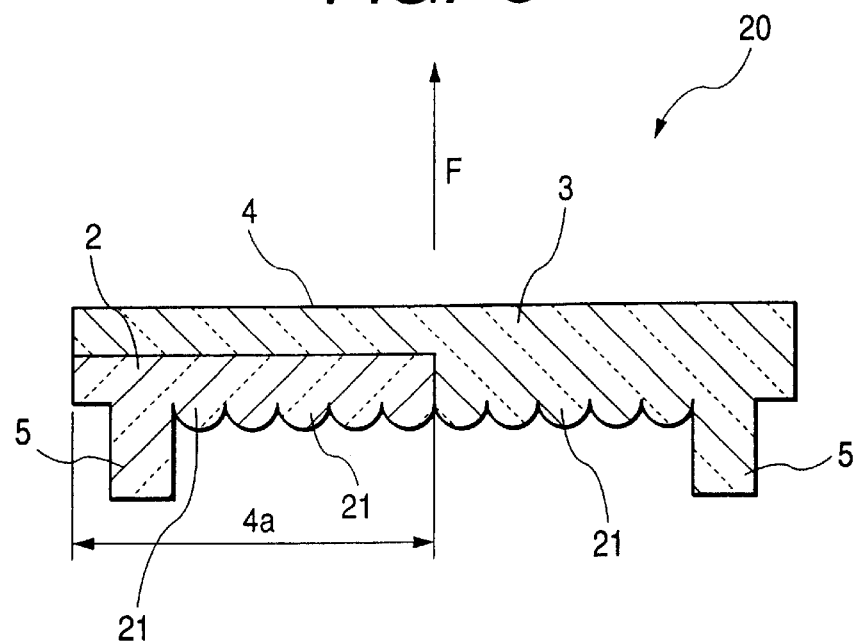
FIG. 5 depicts a schematic view showing a lens for a vehicle lamp and illustrating, together with FIGS. 6 and 8, a modification to the embodiment of the apparatus for manufacturing lenses for vehicle lamps according to the invention.

As shown in FIG. 5, a number of so-called fish-eye lens steps 21 are formed on the internal side of the main portion 4 over both the red resin portion 2 and the clear resin portion 3.

Figure 6:
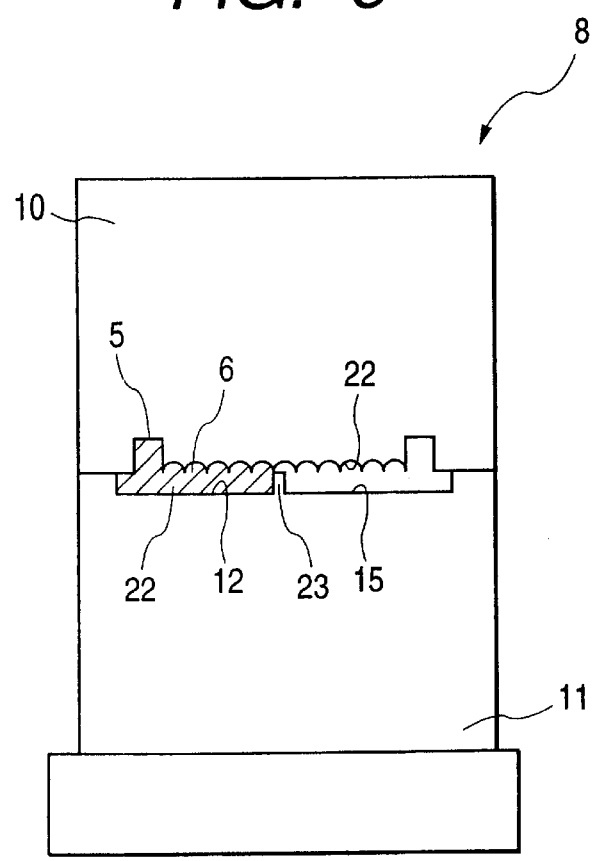
FIG. 6 depicts a schematic view showing a first mold.
Figure 7:
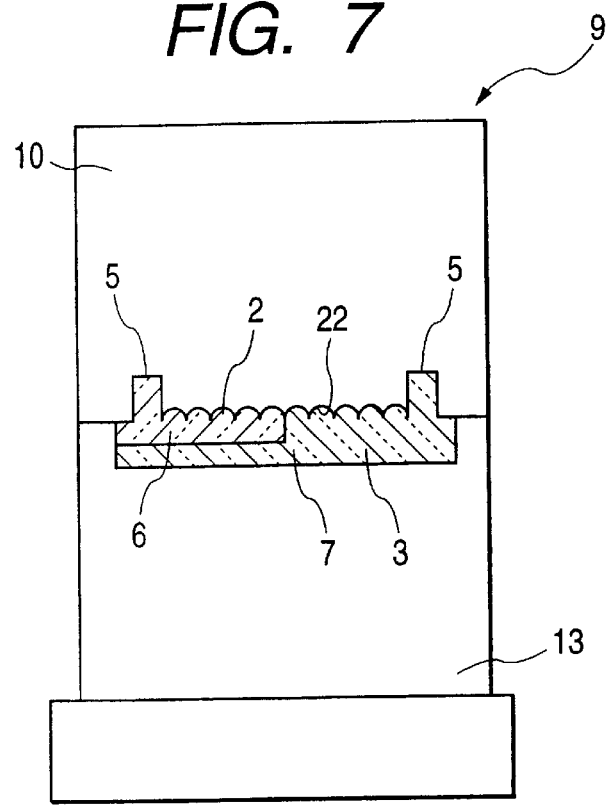
FIG. 7 depicts a schematic view showing a second mold.

As shown in FIGS. 6 and 7, an apparatus for manufacturing the lens for vehicle lamps comprises a first mold 8 used for injecting and molding a red resin (a first resin) portion 6 and a second mold 9 used for injecting a clear resin (a second resin) 7 so as to be molded integrally with the red resin 6 also contained therein.

A molding surface 22 of a common mold 10 is formed into an appropriate shape suitable for formation of fish-eye lens steps 21.

Figure 8:
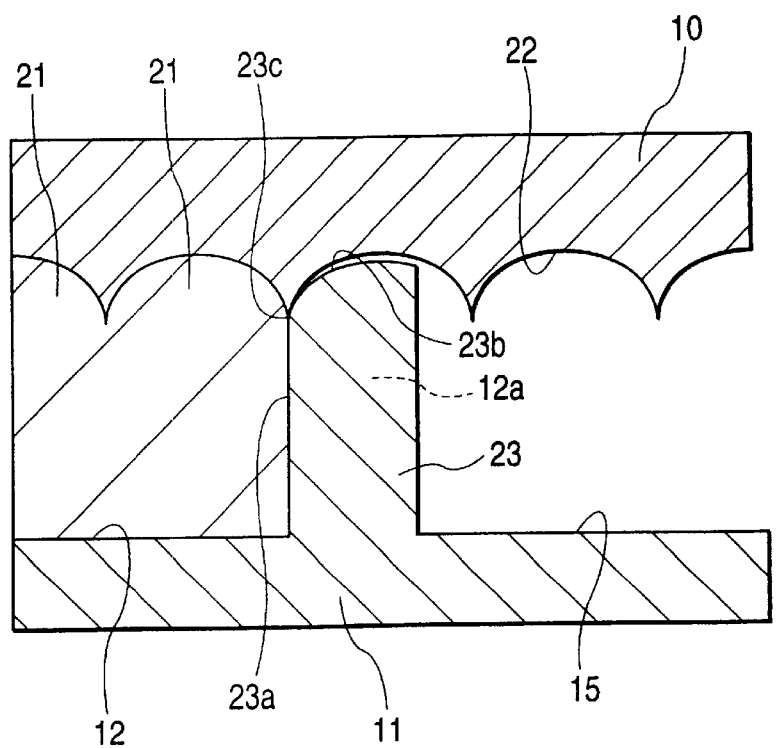
FIG. 8 depicts a schematic view showing a partition wall.
Figure 9:
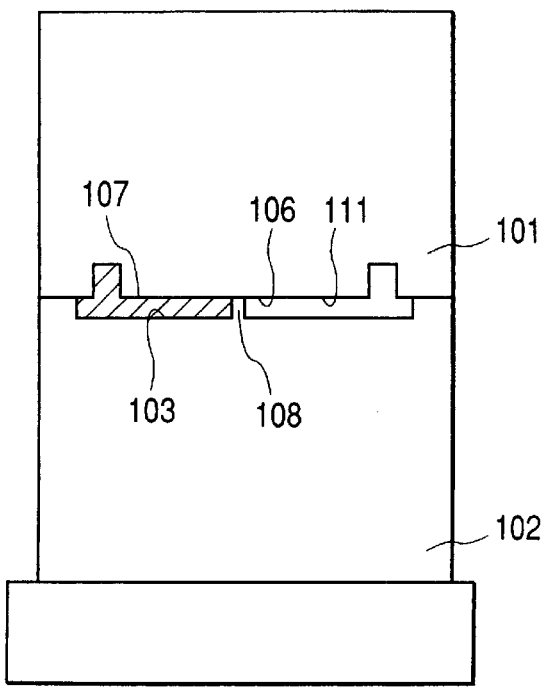
FIG. 9 depicts view showing a mold for molding a first colored resin and illustrating, together with FIGS. 10 and 11, a conventional apparatus for manufacturing lenses for vehicle lamps.
Figure 10:
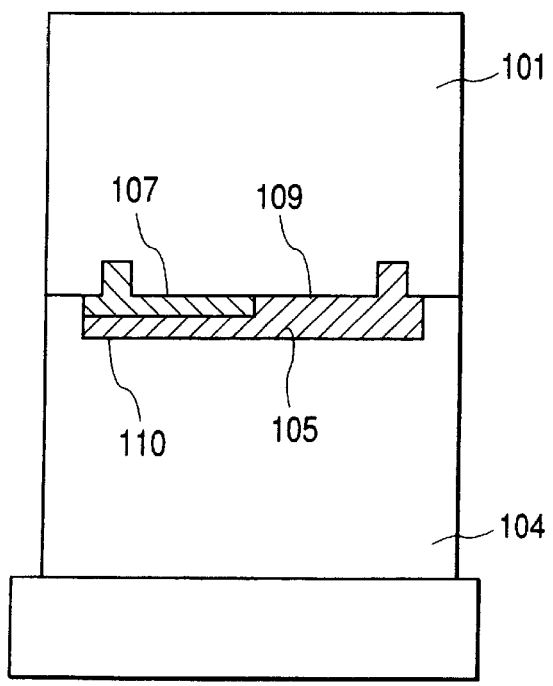
FIG. 10 depicts a schematic view showing a mold for molding a second colored resin.
Figure 11:
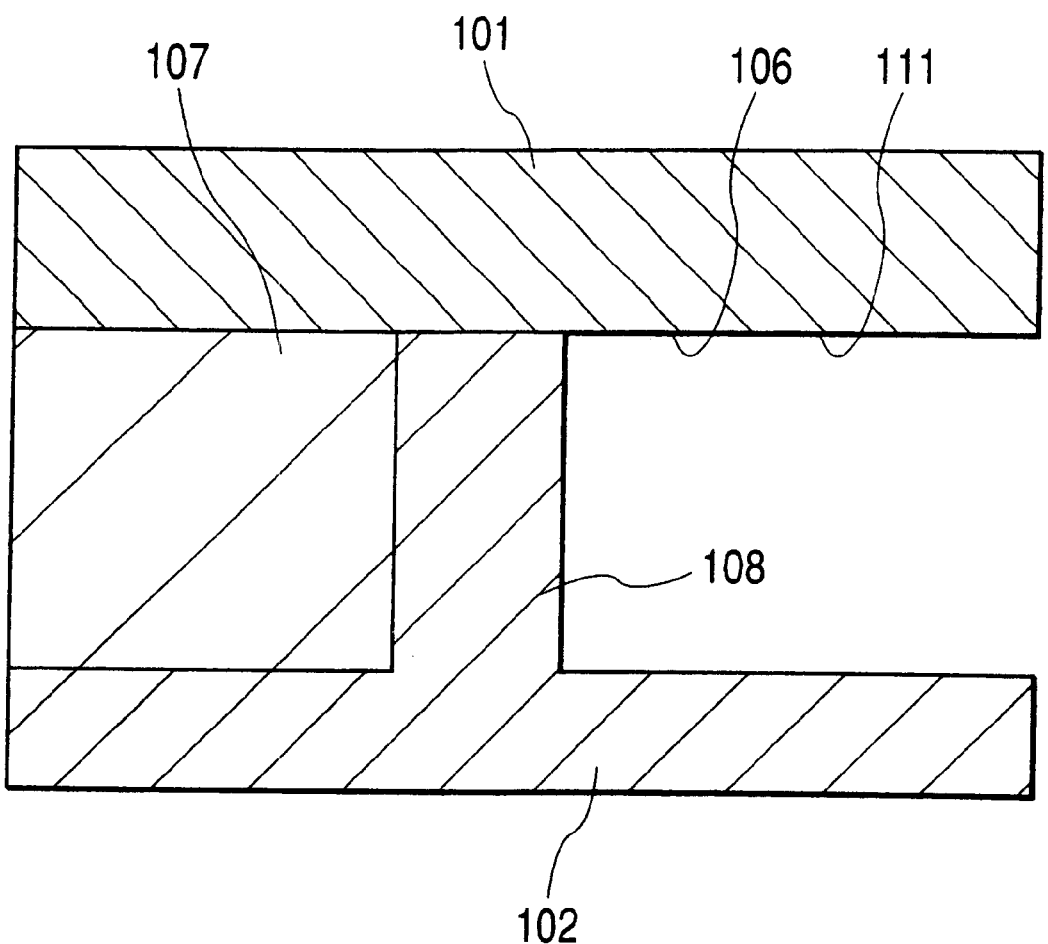
FIG. 11 depicts a schematic view showing a conventional partition wall.

Then, as shown in FIGS. 6 and 8, a partition wall 23 is provided on the first stationary mold 11 in such a manner as to protrude therefrom or protrude therefrom integrally so that when the common mold 10 and the first stationary mold 11 are assembled together, the partition wall 23 is brought into abutment with a molding surface 22 of the common mold 10. The partition wall 23 thereby prevents the red resin 6 from flowing into a portion 15, which constitutes a part of the second cavity 14, when the common mold 10 and the second stationary mold 13 are assembled together.

As shown in FIG. 8, similar to the partition wall 16, the partition wall 23 has a partition surface 23a, a distal end face 23b and an apex portion 23c. When the first mold 8 is clamped, the apex portion 23c is brought into abutment with the molding surface 22, thereby constituting a boundary portion 12a between the first cavity 12 and the portion 15, which constitutes part of the second cavity 14. In addition, the partition wall 23 is shaped such that as the distal end face 23b of the partition wall 23 gets farther from the first cavity 12 side toward the side where the portion 15 exists (i.e., farther away from the partition surface 23a), the partition wall 23 is displaced so as to gradually taper away from the molding surface 22 of the common mold 10. Namely, the distal end face 23b is formed substantially into an arc-like shape in section or is shaped such that the radius of curvature (the variation) thereof increases as the distal end face 23b gets farther away from the first cavity 12.

Note that although a detailed description will be omitted, the shape of the distal end face 23b of the partition wall 23 is formed into an appropriate shape for accommodating the molding surface 22 of the common mold 10 for formation of fish-eye lens steps 21.

Therefore, even with the lens 20, when the first mold 8 is clamped, the partition wall 23 comes into so-called line contact, not surface contact as seen in the case of the prior art, with the molding surface 22 of the common mold 10 at the apex portion 23c thereof. Therefore, even if the contact mark of the partition wall 23 resulting from the repeated use of the first mold 8 is inflicted on the molding surface 22, the contact mark so inflicted will be limited to a minimum size and be formed along the boundary portion 12a between the red resin portion 2 and the clear resin portion 3. As such, the light distribution properties of the lens 20 are not affected at all.

In addition, even if there is foreign matter held between the partition wall 23 and the molding surface 22 of the common mold 10, since the foreign matter does not stay held there due to the shape of the partition wall 23 at the distal end face 23b and the apex portion 23c, there is no risk of a flaw being inflicted on the molding surface 22 of the common mold 10 by the foreign matter.

Note that all the specific shapes and constructions described in the foregoing embodiments are only examples for carrying out the invention, and the technical scope of the invention should not be limited by those examples in any way.

As has been described heretofore, according to the invention, there is provided an apparatus for manufacturing lenses for vehicle lamps, wherein the lenses are formed from at least first and second two types of synthetic resins by molding the first and second synthetic resins integrally with each other, the apparatus comprising a first mold comprising a common mold and a first stationary mold and defining a first cavity in which said first synthetic resin is injection molded, and a second mold comprising said common mold and a second stationary mold and defining a second cavity in which said first synthetic resin and the second synthetic resin are molded integrally with each other with the first synthetic resin being contained within the second cavity. Furthermore, a partition wall is provided on the first stationary mold, in such a manner as to protrude therefrom, for preventing the first synthetic resin from intruding into any place other than said first cavity when the first mold is closed, and wherein a distal end face of the partition wall is shaped such that the distal end face gradually tapers away from the common mold as the distal end face gets farther away from the first cavity. Thus, even if the first mold is used repeatedly, it is possible to eliminate as much risk as possible of a contact mark or flaw being inflicted on the molding surface of the common mold by the distal end face of the partition wall.

Moreover, according to the second aspect of the invention, the distance between the partition wall and the common mold at the distal end face of the partition wall is set such that the variation of the distance increases as the distance from the first cavity increases, and therefore, even if the first mold is used repeatedly, it is possible to eliminate as much risk as possible of a contact mark or flaw being inflicted on the molding surface of the common mold by the distal end face of the partition wall. Furthermore, there is no risk of foreign matter being held between the common mold and the partition wall.

Furthermore, according to the third aspect of the invention, the distal end face of the partition wall is formed substantially into an arc-like shape in section. Therefore, even if the first mold is used repeatedly, it is possible to eliminate as much risk as possible of a contact mark or flaw being inflicted on the molding surface of the common mold by the distal end face of the partition wall. Furthermore, there is no risk of foreign matter being held between the common mold and the partition wall.

Additionally, the partition wall is constructed such that the partition wall contacts the common mold only at an apex portion which constitutes a boundary portion between a partition surface and said distal end face, which is formed substantially into an arc-like shape. Therefore, even if the first mold is used repeatedly, it is possible to eliminate as much risk as possible of a contact mark or flaw being inflicted on the molding surface of the common mold by the distal end face of the partition wall. Moreover, there is no risk of foreign matter being held between the common mold and the partition wall. Furthermore, even if the contact mark and the flaw are inflicted on the first mold, they can be limited to a minimum level.

What is claimed is:

1. An apparatus for manufacturing lenses for vehicle lamps, wherein the lenses are formed from at least first and second synthetic resins by molding said first and second synthetic resins integrally with each other, said apparatus comprising:

a first mold, comprising:
  a common mold; and
  a first stationary mold;
  wherein said first mold defines a first cavity in which said first synthetic resin is injection molded; and
a second mold comprising:
  said common mold; and
  a second stationary mold;
  wherein said second mold defines a second cavity in which said first synthetic resin and said second synthetic resin are molded integrally with each other with said first synthetic resin being contained within said second cavity;

wherein a partition wall is provided on said first stationary mold so as to protrude therefrom, wherein said partition wall is operable to prevent said first synthetic resin from intruding into any place other than said first cavity when said first mold is closed, and wherein a distal end face of said partition wall is shaped such that said distal end face gradually tapers away from said common mold with increasing distance along said distal end face in a direction away from said first cavity.

2. An apparatus for manufacturing lenses for vehicle lamps as set forth in claim 1, wherein a variation of the distance between said partition wall and said common mold at said distal end face of said partition wall increases as the distance from said first cavity increases.

3. An apparatus for manufacturing lenses for vehicle lamps as set forth in claim 1, wherein said distal end face of said partition wall is substantially arc shaped.

4. An apparatus for manufacturing lenses for vehicle lamps as set forth in claim 3, wherein said partition wall contacts said common mold only at an apex portion, wherein said apex portion is a boundary portion between a side surface of said partition wall and said distal end face.

5. An apparatus for manufacturing lenses for vehicle lamps as set forth in claim 1, wherein a molding surface of said common mold is substantially flat, and wherein only an edge of said partition wall contacts molding surface, wherein said edge is defined between a side surface of said partition wall and said distal end face.

6. An apparatus for manufacturing lenses for vehicle lamps as set forth in claim 1, wherein a molding surface of said common mold has grooves operable to form fish eye lens steps in a surface of the lenses, and wherein said partition wall contacts said molding surface at an edge of one of said grooves.

7. An apparatus for manufacturing lenses for vehicle lamps as set forth in claim 1, wherein said partition wall further comprises at least one side surface.

* * * * *